Patented July 27, 1943

2,325,053

UNITED STATES PATENT OFFICE 2,325,053

VITAMIN B6 AND RELATED COMPOUNDS

Stanton A. Harris, Westfield, N. J., assignor to Merck & Co., Inc., Rahway, N. J., a corporation of New Jersey No Drawing. Original application December 27, 1938, Serial No. 247,948. Divided and this application July 3, 1941, Serial No. 400,987

3 Claims. (Cl. 260—295)

This invention relates to a process of preparing vitamin B6, and related compounds, and to new intermediate products made and employed in such process, and is a division of my co-pending application Serial No. 247,948, filed December 27, 1938, now Patent No. 2,248,078.

I have discovered that these compounds may be synthesized by reacting ethoxyacetylacetone and cyanoacetamide to form 3-cyano-4-ethoxymethyl-6-methylpyridone-2, hydrolyzing the latter compound to form the lactone of 3-carboxy-4-hydroxymethyl-6-methylpyridone-2, treating the latter compound with nitric acid to form the lactone of 3-carboxy-4-hydroxymethyl-5-nitro-6-methylpyridone-2, chlorinating the latter compound to form the lactone of 2-chloro-3-carboxy-4-hydroxymethyl-5-nitro-6-methylpyridine, reducing the latter compound to form the lactone of 3-carboxy-4-hydroxymethyl-5-amino-6-methylpyridine, or alternatively, by reducing the lactone of 2-chloro-3-carboxy-4-hydroxymethyl-5-nitro-6-methylpyridine to the lactone of 2-chloro-3-carboxy-4-hydroxymethyl-5-amino-6-methylpyridine, and reducing the latter compound to the lactone of 3-carboxy-4-hydroxymethyl-5-amino-6-methylpyridine, diazotizing the latter compound to form the lactone of 3-carboxy-4-hydroxymethyl-5-hydroxy-6-methylpyridine, and reducing the latter compound to form vitamin B6.

The following example illustrates one method of carrying out the present invention, but it is to be understood that the example is given by way of illustration and not of limitation.

Example

Sixty-five and three tenths gms. of cyanoacetamide are dissolved in 500 cc. of hot 95% alcohol and 93.1 gms. of ethoxyacetylacetone are added. Twenty-five cc. of piperidine are then added with shaking, whereupon the mixture becomes warm. The solution is cooled and allowed to stand overnight, again cooled, and filtered. The crystals are washed with 95% alcohol and a yield of 92 gms. or 81% of white crystals is obtained, having a melting point of 200–202° C. Upon recrystallization from boiling 95% alcohol, crystals of 3-cyano-4-ethoxymethyl-6-methylpyridone-2 are obtained, which have a melting point of 202.5° C.

Fifteen gms. of 3-cyano-4-ethoxymethyl-6-methylpyridone-2 are mixed with 125 cc. of concentrated hydrochloric acid and heated at 120–125° C. for four hours. The reaction mixture is poured into 400 cc. of a mixture of water and ice, whereupon crystals of the lactone of 3-carboxy-4-hydroxymethyl-6-methylpyridone-2 appear. The mass is filtered and washed with water, the dried product weighing 11.1 gms. or about 87% yield. Upon recrystallization from water the crystals have a melting point of 320° C. (uncorrected).

Alternatively, the lactone of 3-carboxy-4-hydroxymethyl-6-methylpyridone-2 may be obtained by refluxing 93 gms. of 3-cyano-4-ethoxymethyl-6-methylpyridone-2 for three hours with 1120 cc. of 50% sulfuric acid, the temperature of the liquid being 120° C. The reaction mixture is poured into 3.5–4.0 liters of water and placed in an ice room overnight. The next day, the crystals are filtered off, washed well with water, alcohol, and ether, and dried at a temperature of 55–60° C. The yield is 70.5 gms. or 88.2% of theory.

Twenty-eight gms. of the lactone of 3-carboxy-4-hydroxymethyl-6-methylpyridone-2 are dissolved in 62 cc. of concentrated sulfuric acid, the solution is cooled, and added to an ice cold mixture of 124 cc. of concentrated sulfuric acid and 52 cc. fuming nitric acid (sp. g. 1.5). The mixture warms spontaneously, reaching a temperature of 35–45° C. After this temperature starts to fall, the mixture is cooled to 15° C. and poured onto crushed ice, the final volume being about one liter. A yellow solid forms immediately, which is filtered off and dried at 65° C. The yield of the lactone of 3-carboxy-4-hydroxymethyl-5-nitro-6-methylpyridone-2 is 29.6 gms. or 83.5%. On recrystallization from water, it melts at 279–280° C., with decomposition.

Fifteen and three tenths gms. of the lactone of 3-carboxy-4-hydroxymethyl-5-nitro-6-methylpyridone-2, 50 cc. of phosphorus oxychloride, and an excess of phosphorus pentachloride (75%) are mixed and refluxed until solution occurs, which requires about ¾ of an hour. The phosphorus oxychloride is distilled off under vacuo, whereupon a solid separates. The solid is dissolved in benzene, filtered and precipitated by the addition of petroleum ether. The total yield of the lactone of 2-chloro-3-carboxy-4-hydroxymethyl-5-nitro-6-methylpyridine is 12.6 gms. or 77% of theory. It may be recrystallized from benzene and ethyl acetate, and has a melting point of 176–178° C.

Two and twenty-eight hundredths gms. of the lactone of 2-chloro-3-carboxy-4-hydroxymethyl-5-nitro-6-methylpyridine are dissolved in 150 cc. of a mixture of ethyl acetate and 95% of ethyl alcohol, 10 gms. of 5% palladium on barium carbonate and 0.3 gms. of platinum oxide are added as a catalyst, and the mixture is hydrogenated under about two atmospheres pressure. The reduction proceeds smoothly and takes up the full four mols of hydrogen in about one hour. The mixture is filtered and the solvent removed by evaporation. The residue is extracted with a mixture of water and chloroform, the chloroform layer is separated, and the chloroform evaporated. The residue is recrystallized from ethyl acetate, and is the lactone of 3-carboxy-4-hydroxymethyl-5-amino-6-methylpyridine; melting point 225–226° C. The picrate of this compound is made by mixing alcohol solutions of the same and picric acid. It is filtered and recrystallized from water or alcohol. The picrate has a melting point of 230° C., with decomposition.

Alternatively, 5.58 gms. of the lactone of 2-chloro-3-carboxy-4-hydroxymethyl-5-nitro-6-methylpyridine is dissolved in 190 cc. of glacial acetic acid, 0.3 gm. platinum oxide added and the mixture shaken with hydrogen at three atmospheres pressure until three molecular equivalents are absorbed. The reduction is stopped, the mixture cooled, filtered and recrystallized from glacial acetic acid. The total yield of the lactone of 2-chloro-3-carboxy-4-hydroxymethyl-5-amino-6-methylpyridine is 2.31 gms. or 48% of theory. It may be recrystallized directly from glacial acetic acid or from strong hydrochloric acid, by dilution and has a melting point of 280–282° C.

Five and ninety-five hundredths gms. of the lactone of 2-chloro-3-carboxy-4-hydroxymethyl-5-amino-6-methylpyridine is suspended in 250 cc. of absolute alcohol with 10 gms. palladium on barium carbonate as a catalyst and shaken with hydrogen at 2–3 atmospheres pressure and 60° C. until the theoretical quantity is absorbed. The solution is filtered from the catalyst and cooled whereupon crystals are obtained. Additional crystals are obtained by evaporation of the alcohol. The total yield of the lactone of 3-carboxy-4-hydroxymethyl-5-amino-6-methylpyridine is 4.3 gms. or 87.5% of theory. The melting point is 225–226° C., and it may be recrystallized from ethylacetate.

The lactone of 3-carboxy-4-hydroxymethyl-5-amino-6-methylpyridine is dissolved in 25% sulfuric acid and sodium nitrite solution is added at about 0° C. The diazo solution is decomposed by adding dropwise to boiling 50% sulfuric acid, the acid is exactly neutralized with sodium hydroxide, the water is removed by evaporation, and the lactone of 3-carboxy-4-hydroxymethyl-5-hydroxy-6-methylpyridine is obtained by extraction with alcohol, M. P. 272–3° C. The latter compound is dissolved in anhydrous acetic acid and sodium amalgam is added until reaction is complete. The acetic solution is diluted with concentrated hydrochloric acid and refluxed for three hours. The solution is then concentrated in vacuo and the hydrochloride of vitamin $B_6$ is extracted with alcohol and crystallized by the addition of acetone. If desired, the vitamin $B_6$ free base can be obtained from the hydrochloride, and has the formula 3,4-di-(hydroxymethyl)-5-hydroxy-6-methylpyridine.

Alternatively, the lactone of 3-carboxy-4-hydroxymethyl-5-hydroxy-6-methylpyridine is dissolved in 30% hydrochloric acid and warmed on a boiling water bath. Granulated tin is added and the mixture heated for one hour. The solution is evaporated to dryness and the residue dissolved in water and treated with hydrogen sulphide to remove the tin. The filtrate is again evaporated to dryness and the vitamin $B_6$ hydrochloride is recrystallized from alcohol and acetone.

Alternatively, the lactone of 3-carboxy-4-hydroxymethyl-5-hydroxy-6-methylpyridine is dissolved in water and reduced with hydrogen in a high pressure bomb at 175° C. with copper chromite as the catalyst. After cooling to room temperature the solution is filtered from the catalyst and evaporated to dryness to obtain vitamin $B_6$.

Modifications may be made in carrying out this invention without departing from the spirit and scope thereof.

I claim:

1. A member selected from the group consisting of the lactone of 3-carboxy-4-hydroxymethyl-6-methylpyridone-2, and the lactone of 3-carboxy-4-hydroxymethyl-5-nitro-6-methylpyridone-2.

2. The lactone of 3-carboxy-4-hydroxymethyl-6-methylpyridone-2.

3. The lactone of 3-carboxy-4-hydroxymethyl-5-nitro-6-methylpyridone-2.

STANTON A. HARRIS.